March 7, 1950 T. M. FERRILL, JR 2,499,376
CONTROL SYSTEM FOR VARIABLE PITCH PROPELLERS
Filed July 30, 1943 2 Sheets-Sheet 1
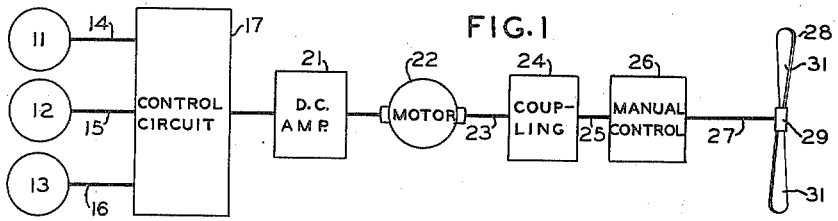
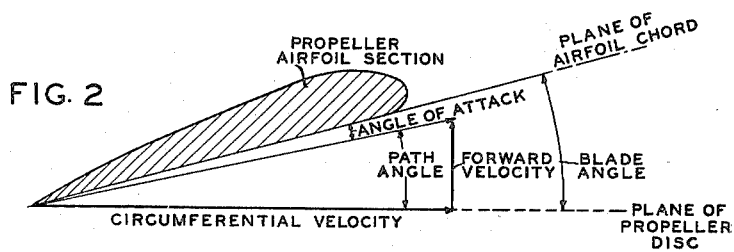
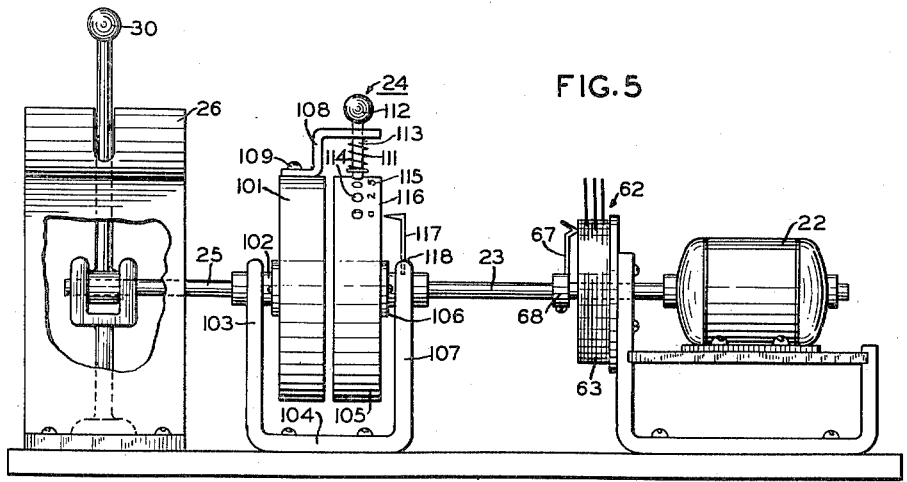
INVENTOR
T. M. FERRILL, JR.
BY
ATTORNEY March 7, 1950 — T. M. FERRILL, JR — 2,499,376
CONTROL SYSTEM FOR VARIABLE PITCH PROPELLERS
Filed July 30, 1943 — 2 Sheets-Sheet 2
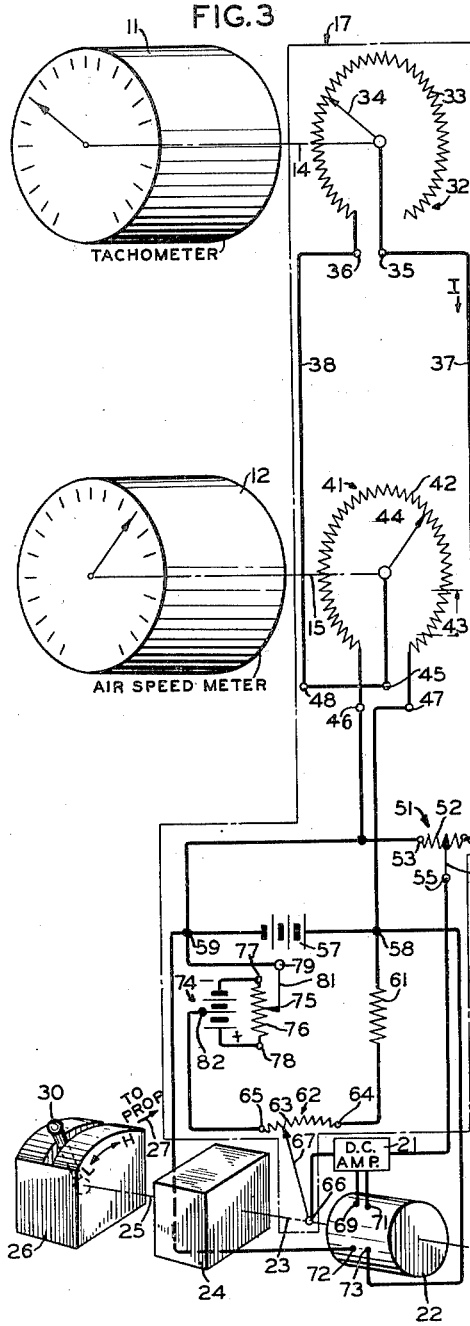
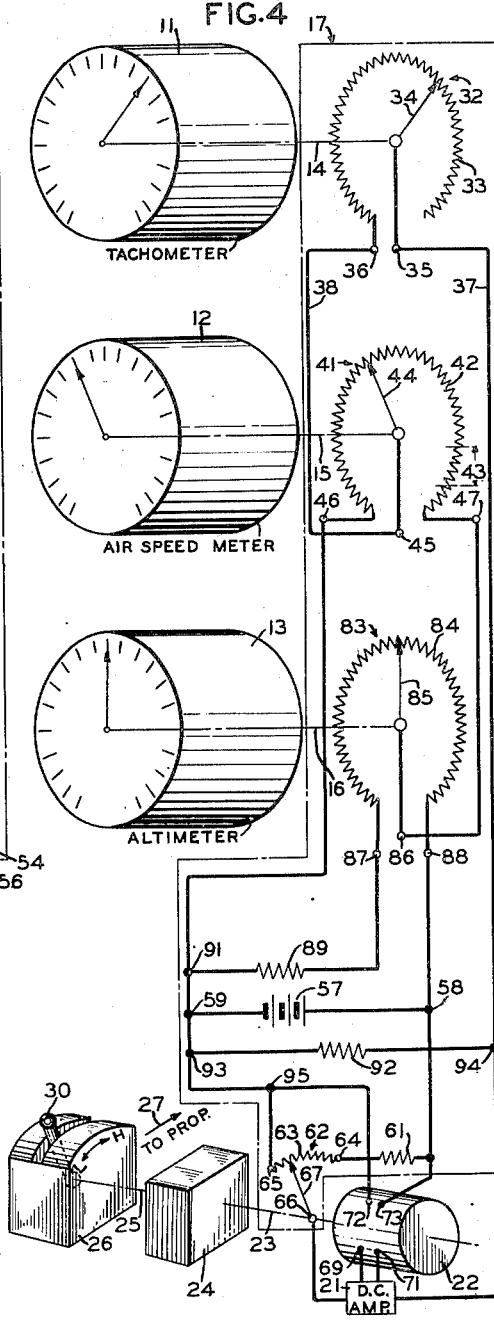
INVENTOR
T. M. FERRILL, JR.
BY Paul B. Hunter
ATTORNEY Patented Mar. 7, 1950

2,499,376

UNITED STATES PATENT OFFICE 2,499,376

CONTROL SYSTEM FOR VARIABLE PITCH PROPELLERS

Thomas M. Ferrill, Jr., Hempstead, N. Y., assignor to The Sperry Corporation, a corporation of Delaware Application July 30, 1943, Serial No. 496,729

8 Claims. (Cl. 170—160.14)

My invention relates to controllable pitch propellers, generally, and, more particularly, to control methods and apparatus therefor.

As an object of my invention I wish to provide a method and apparatus for controlling the blade angle of a propeller in accordance with the ratio of fluid speed through the propeller to its rotational speed.

It is also an object of my invention to provide a control system for a variable pitch propeller which is automatically responsive to a force proportional to the ratio of fluid speed through the propeller to its rotational speed.

A still further object of my invention is to provide an automatic control system for variable pitch propellers for aircraft which automatically maintains the pitch of the propeller at a selected angle of attack as a function of the ratio of fluid speed through the propeller to propeller rotational speed and as a function of the altitude of the craft.

I also wish to provide as an object of my invention a system of control for variable pitch propellers which will selectively provide manual or fully automatic operation thereof.

Another purpose of my invention is to provide apparatus for the automatic control of a variable pitch propeller which is adaptable to existing manually controlled equipment.

An additional object of my invention is to provide apparatus for automatically maintaining the pitch of a variable pitch propeller at those blade angles which will give an optimum average angle of attack for all changes in craft operating conditions.

A still further purpose of my invention is to provide fully automatic control equipment for a variable pitch propeller which will give high propeller efficiency during acrobatic maneuvers as well as under transport operating conditions.

It is a further purpose of my invention to provide a control system for variable pitch propellers in which instruments of the propelled craft, through suitable translating apparatus, are caused to change the pitch of the propeller in accordance with an optimum combination of the variables measured by these instruments.

Other objects of my invention will become apparent and those listed more evident as the description proceeds.

In carrying out my invention, in a preferred embodiment thereof shown applied to an airplane, I take advantage of equipment already available in the plane, presupposing of course, that it is equipped for manual remote control of propeller pitch, as by a lever manually positioned according to the desired propeller pitch or blade angle.

Since the proper blade angle at which an airplane propeller operates is primarily a function of airspeed and propeller speed, it is possible for me to automatically maintain a selected average angle of attack of the propeller blades through a novel control system which receives its data from flight instruments forming a part of the plane's standard equipment.

By suitable pick-off means from the airplane's airspeed meter, and tachometer, I operate take-offs in a ratio control circuit for a reversible servomotor in accordance with changes in the variables as normally measured by the above mentioned flight instruments.

This motor is selectively coupled to the plane's manual pitch control-lever and acts through this mechanism and its associated apparatus automatically to maintain the blades of the propeller at a desired angle of attack.

In a modification of my invention I provide, in the control circuit of the motor, additional means for including altitude as a part of the data to which the control system is responsive. Thus, I am able to provide an automatic control system which is dependent upon measured quantities of various craft operating conditions, such as altitude, as well as air fluid speed and propeller rotation speed.

As will be pointed out later, my invention is not restricted to the use of instruments, manual control equipment, or other apparatus installed as standard equipment in the craft, but provides in itself a system of control which may or may not utilize any part or all of such equipment. Accordingly, manual control unit 26 might represent the cockpit manual control of a Curtiss electrically operated variable pitch propeller, to any setting of which the electric motor in the propeller hub automatically drives the blades. Alternatively, the electric motor in the hub of the Curtiss propeller could replace motor 22, with potentiometer 62 installed in the propeller hub and driven by said motor in synchronism with the pitch variation of the propeller blades. The arrangement of a small motor 22 in the cockpit, coupled through the pointer or manual control element in the cockpit to a separate hub power unit such as that of the Curtiss propeller for blade pitch variation, is considered the preferred embodiment of the present invention.

A more comprehensive understanding of my invention will be afforded from the following detail description when considered with the accompanying drawings, in which Fig. 1 is a block diagram of a control system for a variable pitch propeller embodying my invention, Fig. 2 is a typical propeller airfoil section showing blade angle, path angle, and angle of attack, Fig. 3 is a schematic diagram of an embodiment of my invention, Fig. 4 is a modified form thereof, and Fig. 5 is an elevational view showing details of the coupling means illustrated in box form in Figs. 1, 3 and 4.

Like reference numerals have been used throughout in the drawings to designate like parts.

In the control system illustrated in Fig. 1, embodying my invention, I provide a group of flight instruments 11, 12, and 13 which are capable of measuring phases of performance of the craft which is being propelled or, in the case of an airplane, various flight conditions. These instruments may or may not form part of the craft's standard equipment. In either case, pick-off means 14, 15, and 16 are respectively attached to these meters for conveying to a control circuit 17 data measured by these instruments.

Within control circuit 17, which is responsive to changes in phases of performance of the craft, or flight conditions, a voltage is developed which is transmitted to a signal or a direct current amplifier 21 where it is amplified for the purpose of driving a reversible direct current motor 22. This motor, which is equipped with internal reduction gears, provides a high torque, low speed drive for a propeller pitch-changing means 27 through shaft 23, coupling device 24, and shaft 25 and optionally through manual control means 26.

As illustrated, the system is operable through a manual propeller pitch control means 26 which may be a part of the craft's standard equipment. The system is equally operable however as a combined automatic and manual propeller pitch-changing means without this element, since, as will be explained later, manual operation is provided in the coupling device 24. It may be operated also as a fully automatic control system without any provision for manual operation. In any event, the signals or forces produced in the control circuit 17, which are a function of the variables representing the various craft operating conditions, as measured by the instruments 11, 12, and 13, are translated within the driving means 22 to the controllable pitch propeller 28 having a hub 29 and movable blades 31.

As is well known to those skilled in the art, the blades 31 of the variable pitch propeller 28 which, for example, may be a Curtiss electric controllable propeller, are movably mounted in hub 29 and are capable of being angularly displaced about an axis transverse to the axis of rotation of the propeller by forces transmitted from manual control means 26 through its associated pitch-changing mechanism 27.

In one form of my invention, the control circuit 17 is illustrated in detail in Fig. 3. In this embodiment the pitch of the propeller is varied in accordance with changes in linear fluid speed of the craft and the propeller and in rotary propeller speed. Instrument 11 is illustrated as a tachometer which may measure engine speed or rotary propeller speed, depending upon the rotational relationship of engine and propeller. The quantity measured by this instrument should be proportional to the rotary speed of the craft propeller.

Meter 12 is illustrated as an air-speed meter, as would be applicable in the case of aircraft. It measures fluid speed, one of the functions upon which maximum propeller efficiency depends. The quantity measured by tachometer 11 is taken from the instrument by a suitable pick-off element 14 and transmitted to a variable resistor 32 having a winding 33 and arm 34. To the terminals 35 and 36 of this variable resistor are respectively connected conductors 37 and 38.

In a similar manner the data provided by air speed meter 12 is taken by pick-off means 15 and transmitted to a potentiometer 41 having a winding 42 and arm 44.

Thus far it may be assumed that the windings 33 and 42 of elements 32 and 41, respectively, are such that variations over their complete range of resistance are linear. However, for purposes which will be explained in connection with the system's operation, it may be advisable to vary the resistance of the windings over a section such as 43, in winding 41.

The terminal 45 of potentiometer 41 is connected to line 38 at point 48 and terminal 46 to reference terminal 59 of source 57 through a suitable conductor. Terminal 47 is also connected to terminal 58 of energy source 57. A potentiometer 51 having a winding 52, an arm 56, and terminals 53, 54 and 55 has its winding connected in series with terminal 35 of variable resistor 32 and terminal 46 of potentiometer 41. Across the terminals 58 and 59 of energy source 57 and in series therewith is connected a resistor 61 and the winding 63 of potentiometer 62 having terminals 64, 65, and 66 and variable arm 67. Also within this circuit is connected an energy source 74, illustrated as a battery, having a neutral terminal 82. Across the positive and negative terminals of energy source 74 is connected a potentiometer 75 having a winding 76, terminals 77, 78, and 79, and arm 81.

From terminal 55 of potentiometer 51 and terminal 66 of potentiometer 63, the output of control circuit 17 is delivered to a direct current amplifier 21 whose output in turn is delivered to the armature terminals 69 and 71 of the reversible direct current motor 22. Energy is supplied to the field windings of this driving element from energy source 57 through suitable conductors and delivered to field terminals 72 and 73 thereof.

From power source 22, power is transmitted through shaft 23, coupling element 24, shaft 25, and optionally through manual control element 26, to propeller-changing means 27, as described above.

In the modification illustrated in Fig. 4, provision is made for varying the pitch of the propeller through the control system illustrated in Fig. 1 as a function of another variable, such as altitude in aircraft applications.

The control circuit illustrated in Fig. 4 is identical with that illustrated in Fig. 3 to the point represented by the terminals 45, 46, and 47 of potentiometer 41. At this point, an additional meter 13 capable of measuring altitude is provided. A potentiometer 84 is varied in accordance with the quantity measured by meter 13 through pick-off element 16. Potentiometer 83 is provided with a winding 84, an arm 85, and terminals 86, 87, and 88. A resistor 89 is connected in series with terminal 46 of potentiometer 41 and terminal 87 of potentiometer 83 through connection 91. Terminal 47 of potentiometer 41 is also connected by a suitable conductor to terminal 86 of potentiometer 83, and terminal 88 of potentiometer 83 is connected to energy source 57 through terminal 58 thereof. Through these connections, energy source 57 is connected across one arm of potentiometer 83 and one arm of potentiometer 41. A resistor 92 is connected across the terminals 46 and 47 of potentiometer 41 at points 93 and 94.

The remaining portion of the circuit is connected as described with reference to Fig. 3 through the connection 95, with the lone exception that the potentiometer 75 and energy source 74 have been omitted in the illustration of this embodiment. This last described portion of the circuit, being optional, may be included or omitted in either of the circuits.

One form of the coupling device 24 illustrated in box form in Figs. 3 and 4 is shown in detail in Fig. 5. It comprises a coupling cylinder 101 which is connected through shaft 25 to manual control element 26 through the plate and collar member 102 which in turn is journaled in bearings in the upwardly extending arm 103 of U-shaped support member 104. A second coupling member 105 is rigidly attached to shaft 23 by means of a plate and collar member 106 which is journaled in like manner in upwardly extending arm 107 of support member 104.

To the periphery of coupling cylinder 101 is attached an offset extension arm 108 through suitable screw means 109. Carried within the offset extension arm 108 is a lift pin 111 having a knob 112 which provides a handle for the operator. Lift pin 111 is held in engagement with holes 114 drilled in the periphery of coupling cylinder 105 by means of a spring 113. Opposite the holes 114, graduations 115 are provided for visually indicating an average angle of attack corresponding to the adjustment provided by the hole opposite thereto. On the face 116 of coupling cylinder 105 is carried a radial calibration (not shown) which, together with the indicator pointer, or index, 117, rigidly mounted in arm 107 of support member 104, is provided to indicate path angle as determined by the control circuit 17 from the measurements of instruments 11, 12 and 13. Obviously, this path-angle indicating means may be any suitable metering device which will indicate the angular position of cylinder 105.

The theory upon which my invention is based and the operation thereof can best be explained by first presenting fundamental definitions, well known in the art, of variables upon which choice of optimum propeller blade angle is dependent.

In Fig. 2 there is diagrammed a propeller airfoil section which may be considered as a cross-section of either of the blades 31 of variable pitch propeller 28 illustrated in Fig. 1. Upon this section of the propeller, there are a number of forces acting which, for the sake of our description, may be limited to those acting in the directions of the forward velocity and circumferential velocity components of the propeller.

As illustrated, the circumferential velocity component operates in a plane of the propeller disc and is at right angles to the forward velocity. The resultant velocity component makes an angle with the circumferential velocity component which is defined as the path angle. The blade angle of the particular section illustrated is the angle between the chord of the airfoil section and the propeller disc. This angle represents the sum of the path angle and the angle of attack.

It is to be noted here that both the blade angle and the angle of attack are for a particular airfoil section, and when referred to as pertaining to the propeller as a whole, are considered to be for a propeller airfoil section taken at an average effective radius of the propeller, usually of the order of 75% to 80% of the maximum radius.

Means as outlined above have been provided for maintaining the angle of attack substantially constant by varying the pitch of the propeller or blade angle as the quantities on which path angle is dependent vary. Accordingly a function which may be achieved by means of the system embodying my invention is to automatically vary the pitch of the propeller for the purpose of maintaining the angle of attack approximately constant throughout changes in craft operating conditions.

The propeller path angle of an airplane may vary from an angle of 5° at start of takeoff to 36° in gliding, or an even greater angle during a power dive, during the various flight operations of takeoff-run, climbing, and cruising. In order to maintain a selected angle of attack, for example, 10°, it is evident that the blade angle or pitch of the propeller must be changed throughout these changes in operating conditions from an angle of 15° at start of takeoff run to 46° during the craft's glide, or a still greater angle for a power dive.

Such changes in blade angle or propeller pitch are effected by the system illustrated in Fig. 3 in the following manner.

Across the terminals of source 57 is provided a fixed voltage which is impressed upon potentiometer 41 through terminals 46 and 47, and, in accordance with variation in air speed as measured by air speed meter 12, variations are effected in the output voltage, $E_1$, proportional to air speed corresponding to the forward velocity vector of Fig. 2, across the terminals 45 and 46 of potentiometer 41. This voltage, $E_1$, is impressed on the series circuit including terminals 35 and 36 and the resistance therebetween, and the resistance 52, between terminals 53 and 54. The portion of resistance 33 included between terminals 35 and 36 varies substantially proportionately to the propeller rotation speed, and hence proportionately to the circumferential velocity vector of Fig. 2. Furthermore, the resistance of 33 corresponding to slow propeller rotation should be large compared to the total resistance, 52, between terminals 53 and 54. Resistance 33 should also be quite large compared to the resistance of potentiometer 41.

In accordance with Ohm's law, there is caused to flow through conductor 37 under the pressure of the electro-motive force $E_1$ a current which is substantially proportional to the ratio $E_1/R$ (35, 36) and corresponds to the ratio of forward fluid speed to tangential speed of the craft's propeller. This, in turn, is equal to the product of a constant K multiplied by the tangent of the path angle, equal to the propeller blade angle minus the angle of attack. The current I flowing through winding 52 of potentiometer 51, develops a small voltage V between the fixed terminal 53 and the adjustable element 56 thereof which is substantially proportional to the ratio of forward fluid speed to rotary speed of the propeller. With reference to terminal 59, a potential substantially proportional to the ratio of forward fluid speed to airfoil circumferential velocity is applied to one input terminal of amplifier 21. Thus, with constant rotary speed of the propeller, resulting in a contant value of resistance 33 between terminals 35 and 36, the signal produced across resistor 51 between terminals 53 and 55 (or across resistor 92 in Fig. 4) is dependent on the forward fluid speed measured by meter 12. If the rotary speed of the propeller varies, however, the signal produced between terminals 53 and 55 (or across resistor 92) will be modified accordingly by changes resulting in the position of resistor arm 34.

Another signal is applied to the other input terminal of amplifier 21 by the arm 67 of potentiometer 62. Potentiometer 62 is connected with the pitch control mechanism so that movement of the motor shaft 23, accompanied by a change of the path angle of the propeller airfoil produces a corresponding movement of arm 67 relative to the stator 63 of potentiometer 62. The potential of arm 67 with respect to terminal 59 may thus be made proportional to the tangent of the angle through which the shaft 23 is rotated, according to the resistance taper of winding 63. If the angle through which the pitch control lever 30 is varied is proportional to the angle of variation of the propeller pitch, then the difference of the two potentials applied to the amplifier input terminals causes the reversible direct current motor 22 to operate in a direction determined by the potential of the voltage impressed on the armature terminals 69 and 71. The resultant operation of motor 22 transmitted through the shaft 23 and, through the coupling device 24, and optionally through element 26, operates the propeller-changing means 27 in accordance with the instrument indications.

The operation of the embodiment illustrated in Fig. 4 is identical with that of the embodiment illustrated in Fig. 3 with the exception that the voltage impressed upon the terminals 45 and 47 of potentiometer 41 is a function of altitude, and is varied in accordance with variations in the position of arm 85 of potentiometer 83 which correspond to measurements of altitude by altimeter 13.

The resistor 89 is connected in series with one arm of potentiometer 83 for the purpose of limiting the degree of control which will be effected by variations in altitude. Thus, if resistor 89 is made very large in comparison with the resistance of winding 84, large changes in altitude will effect only a slight change in the potential applied to potentiometer 41 between terminals 46 and 47.

Under the above-described operation it was assumed that the windings of variable resistor 32, and potentiometer 41 and 83 were such as to give linear variation in resistance of these respective windings in accordance with changes in the measured quantities of the respective meters connected to them.

Aeronautical design requirements may be such that the angle of attack of the propeller should be variable as a function of the quantity measured by any of the instruments 11, 12, or 13 over a selected range. For example, if an angle of attack of 10° is to be maintained for air speeds within the range of 0 to 200 miles per hour, it may be desired that the angle of attack be increased to 12° when the craft is operating at speeds in the vicinity of 300 miles per hour and again returned to an angle of attack of 10° at 400 miles per hour. Provision for such operation may be made in my control system through means of a non-uniform winding resistance gradient such as that for potentiometer 41, e. g. within the portion designated as section 43.

Thus, it is apparent that the characteristics of the variable means 32, 41, and 83 may be altered over a selected range to give any desired change of propeller angle of attack as a function of flight conditions as measured by any of the instruments 11, 12 or 13.

By utilizing the method of controlling the sensitivity of the circuit as previously described with regard to the altimeter 13 through the resistor 89 and by changing the characteristics of the various circuit parameters, a wide range of flexibility is afforded to meet the requirements of various developments in aeronautical design.

Latitude of operation is also provided by the novel coupling arrangement 24 which is interposed between the driving means 22 and the manual control means 26. This coupling device provides for the manual selection of any desired angle of attack within the range of the system. For example, if the system is operating automatically and manual control is desired by the operator, such operation may be effected by disengaging lift pin 111 from engagement with coupling cylinder 105. Thereafter, manual control may be retained by continued withholding of the pin 111 from engagement.

Such operation provides a wide flexibility in meeting the requirements of the operator, particularly in connection with the path angle indicator associated with coupling cylinder 105. This device provides the operator with visual indication of the path angle which the automatic control system is detecting in accordance with variations in the flight conditions as measured by the instruments 11, 12, and 13. If a change in this angle of attack is desired by the operator, it is possible to select the desired angle by disengaging pin 111 and rotating coupling cylinder 104 through an angle necessary to bring lift pin 111 above the selected angle of attack as indicated by graduations 115 and engaging the same in the slot provided opposite this graduation.

An electrical circuit arrangement which may be used as an optional means for resetting the angle of attack is shown in Fig. 3 as embodying potential source 74 and potentiometer 75.

With terminal 59 of energy source 57 taken as a reference point, it is possible to maintain the point of the mid-tap 82 of energy source 74 at the potential of terminal 59, and under such conditions no change is effected in the potential of the voltage applied to the armature windings of reversible direct current motor 22 through direct amplifier 21. If, however, the operator desires to change the angle of attack which is to be automatically maintained in accordance with variations in flight conditions measured by the meters 11, 12, and 13, and an established by the fixed parameters 33, 42, and 84 within the control circuit, he may move the arm 81 of potentiometer 75 from the mid-point thereof in accordance with graduations on a dial provided on potentiometer 76 which will adjust the control circuit 17 for the propeller attack angle selected. Such selection is effected by adding a potential to the control voltage, either positive or negative in accordance with the angle of attack selected.

Through the coupling element 24 my system provides the novel means of control which is manually or automatically operable as desired by the operator, and, by the same device, the control system embodying my invention is adaptable to existing manual control equipment. It provides a wide range of flexibility in the choice of the control factors which dictate the data from which the automatic portion of the system is controlled. Such flexibility of course offers an opportunity for a number of variations and modifications of my invention, and accordingly it is to be understood that the representations and descriptions herein made are to be considered as illustrative only and nowise in a restrictive sense. It is to be understood also that although I have described my invention in connection with its application to aircraft, it is not my intention to limit it thereto. With slight modifications the invention is applicable to any other fluid-borne craft, and accordingly I desire to consider my invention of such breadth as is defined by the appended claims.

What is claimed is:

1. In a fluid-borne craft, a variable pitch propeller, means for changing the pitch of said propeller, an electric motor for driving said pitch-changing means, selectively operable means for manually controlling the pitch of said propeller, means responsive to axial fluid speed and also the rotary speed of said propeller for producing a signal corresponding to the average propeller path angle, and means responsive to said last-named means for controlling said electric motor to maintain a selected average angle of attack, and means for visually indicating average angle of attack.

2. In combination, a variable pitch propeller; remote control means for varying the pitch of said propeller; means responsive to current flow for controlling said remote pitch-varying means comprising, a forward fluid speed measuring device and a propeller rotation speed measuring device, an electric motor having a control circuit therefor, variable means within said control circuit for controlling current flow, and means continuously responsive to said measuring devices for adjusting said variable means in accordance with the ratio of the measurements of said devices.

3. In a craft propelled by a variable pitch propeller means, a control system for variable pitch propellers, comprising a propeller pitch-varying mechanism responsive to the speed of the craft for developing an electromotive force substantially proportional to said speed, means responsive to the rotary speed of the propeller for developing a resistance substantially proportional to said rotary speed, means for applying said electromotive force to said resistance to produce a flow of current, and means for controlling said propeller pitch-varying mechanism in accordance with the flow of said current.

4. Apparatus comprising a controllable pitch propeller, manual means for varying the pitch of said propeller, automatic means operable through said manual means for maintaining said propeller at a predetermined angle of attack, means for selectively engaging or disengaging said automatic means, and means within said last-named means for manual selection of said angle of attack.

5. In a system for controlling the average angle of attack of a variable pitch propeller on a fluid-borne craft, apparatus comprising a motor having a shaft adapted to be coupled to said propeller for varying the blade pitch thereof in accordance with the displacement of said shaft, means coupled to said motor for producing a first signal dependent on the displacement of said shaft from a predetermined reference position, means for producing a second signal dependent on forward speed, means for modifying said second signal according to rotary propeller speed of the craft, and means responsive to said first signal and the modified signal for exciting said motor in accordance with the difference of said first signal and said modified signal whereby the pitch of said propeller varies as a predetermined function of said forward and rotary speeds.

6. An automatic craft propeller system comprising a craft propeller having a plurality of variable pitch blades, motive means for varying the pitch of said blades, means for providing a signal varying according to the pitch angle of said blades, means jointly responsive to craft forward speed and propeller rotation speed for providing a signal varying according to the relation between said speeds, and means for actuating said motive means to increase or decrease the pitch of said blades according to the relative values of said pitch angle signal and said signal varying according to the relation between said speeds.

7. In an automatic propeller system, a controllable pitch propeller, manually controllable means for adjusting and holding the pitch of said propeller to any desired pitch within its range of pitch variation, means responsive to the axial fluid speed of said propeller and also responsive to the rotary speed of said propeller for determining the path angle of said propeller, and means responsive to said last named means and operating through said manually responsive means for automatically controlling the pitch of said propeller to maintain a selected average angle of attack.

8. The apparatus of claim 7 further including means responsive to the altitude of said system for automatically increasing the pitch of said propeller as said altitude is increased.

THOMAS M. FERRILL, Jr.

REFERENCES CITED

The following references are of record in the file of this patent:

UNITED STATES PATENTS

| Number | Name | Date |
| --- | --- | --- |
| Re. 22,034 | Hoover | Feb. 24, 1942 |
| 1,374,787 | Walker | Apr. 12, 1921 |
| 1,389,830 | Horne | Sept. 6, 1921 |
| 1,506,936 | Lea | Sept. 2, 1924 |
| 1,780,431 | McCarroll | Nov. 4, 1930 |
| 1,830,858 | Schoepp | Nov. 10, 1931 |
| 1,857,392 | Nixon | May 10, 1932 |
| 1,908,894 | Findley | May 16, 1933 |
| 2,113,478 | Gobereau | Apr. 5, 1938 |
| 2,127,687 | Heath | Aug. 23, 1938 |
| 2,219,303 | Fraser | Oct. 29, 1940 |
| 2,244,139 | Buckingham | June 3, 1941 |
| 2,272,664 | Gropler | Feb. 10, 1942 |
| 2,293,912 | Mullen | Aug. 25, 1942 |
| 2,297,213 | Gosslau | Sept. 29, 1942 |
| 2,305,146 | D'Aschanio | Dec. 15, 1942 |
| 2,307,039 | Hammond | Jan. 5, 1943 |
| 2,322,303 | Martin | June 22, 1943 |
| 2,334,967 | Thomas | Nov. 23, 1943 |
| 2,347,104 | Hoover | Apr. 18, 1944 |

FOREIGN PATENTS

| Number | Country | Date |
| --- | --- | --- |
| 351,413 | Great Britain | June 15, 1931 |
| 378,367 | Italy | Feb. 1, 1940 |
| 649,057 | Germany | Apr. 23, 1938 |

OTHER REFERENCES

Ser. No. 303,551, Gosslau (A. P. C.) published May 18, 1943.

Certificate of Correction

Patent No. 2,499,376 March 7, 1950

THOMAS M. FERRILL, Jr.

It is hereby certified that errors appear in the printed specification of the above numbered patent requiring correction as follows:

Column 2, line 25, strike out the word "air"; column 3, line 21, before "voltage" insert *signal or*; line 22, strike out "a signal or"; column 8, line 50, for "and an" read *and as*;

and that the said Letters Patent should be read with these corrections therein that the same may conform to the record of the case in the Patent Office.

Signed and sealed this 20th day of June, A. D. 1950.

[SEAL]

THOMAS F. MURPHY,
*Assistant Commissioner of Patents.*